Figure 1:
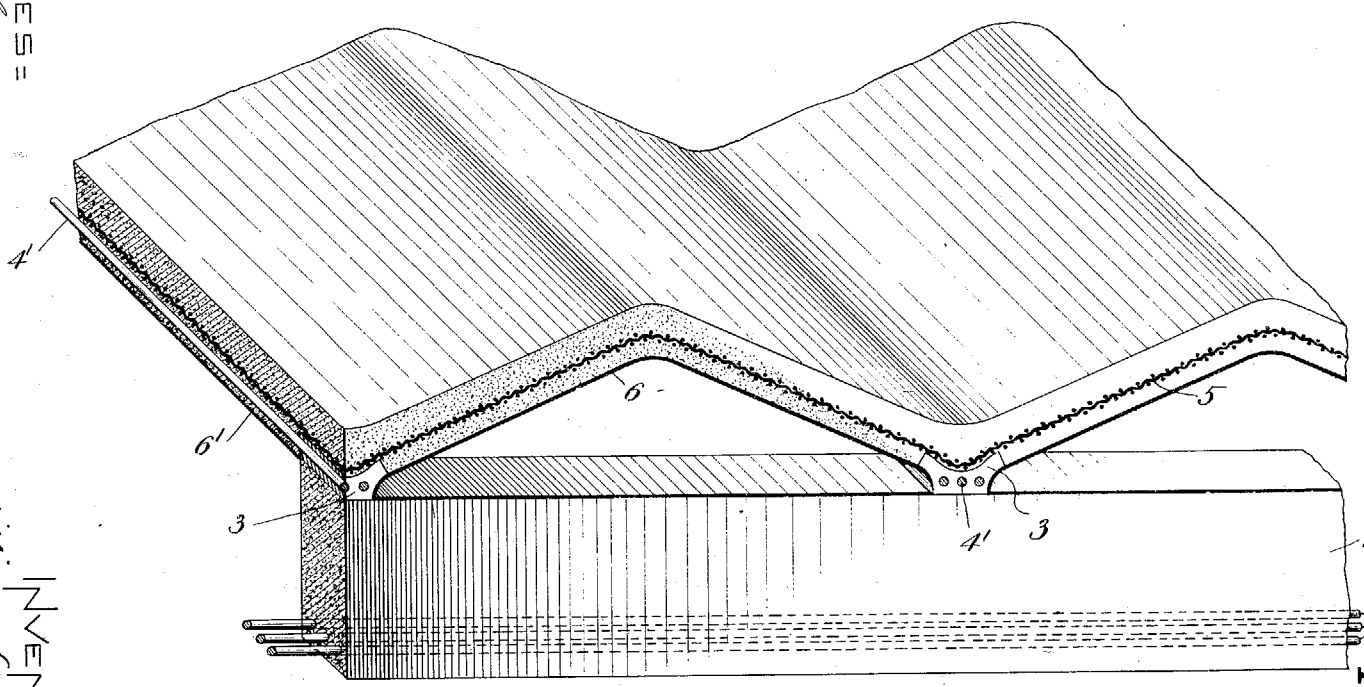

W. L. CHURCH.

REINFORCED CONCRETE CONSTRUCTION.

APPLICATION FILED JUNE 15, 1914.

Reissued July 21, 1914.

2 SHEETS—SHEET 1.

13,775.

WITNESSES:
Patrick J. Conroy.
John Buckler

INVENTOR:
William L. Church
by Browne & Woodworth
attys.

W. L. CHURCH.

REINFORCED CONCRETE CONSTRUCTION.

APPLICATION FILED JUNE 15, 1914.

Reissued July 21, 1914.

2 SHEETS—SHEET 2.

13,775.

WITNESSES-
Patrick J. Conway
John Buckler,

INVENTOR:
William L. Church
by Browne & Woodworth
attys.

UNITED STATES PATENT OFFICE.

WILLIAM L. CHURCH, OF NEW YORK, N. Y., ASSIGNOR TO AMBURSEN COMPANY, OF BOSTON, MASSACHUSETTS, A CORPORATION OF NEW JERSEY.

REINFORCED CONCRETE CONSTRUCTION.

13,775. Specification of Reissued Letters Patent. Reissued July 21, 1914.

Original No. 1,097,915, dated May 26, 1914, Serial No. 717,997. Application for reissue filed June 15, 1914. Serial No. 845,139.

*To all whom it may concern:*

Be it known that I, WILLIAM L. CHURCH, a citizen of the United States, and a resident of New York, in the county and State of New York, formerly a resident of Boston, Massachusetts, have invented a new and useful Improvement in Reinforced Concrete Construction, of which the following is a specification.

The present invention relates to reinforced-concrete construction, and its object is to provide a method of making a practicable, efficient and economical reinforced-concrete roof.

One form of roof made in accordance with my method is illustrated in the drawings which accompany and form a part of this specification, although it will be understood that various modifications may be made in details of construction of the particular roof shown without departing from the invention defined in the appended claims.

Figure 2:
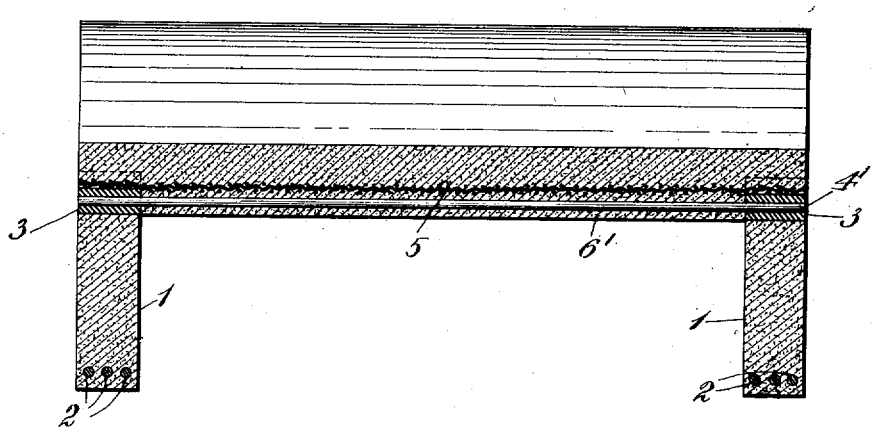
Figure 3:
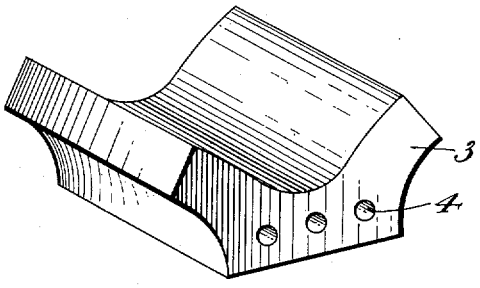

In the drawings:—Figure 1 is a perspective view of my improved reinforced-concrete roof; Fig. 2 is a transverse section thereof, and Fig. 3 is a perspective view of a detail of construction.

In the particular drawings selected for more fully disclosing my invention, 1 represents a supporting beam constituting a part of the wall of a building herein shown as formed of concrete reinforced by the rods 2. At suitable intervals along the top of the beam are placed oppositely disposed saddles or gaggers 3, preferably of concrete, arranged to have their holes 4, shown in the present instance as three in number, in alinement. The saddles comprise, as shown, a flat base portion, preferably equal in length to the thickness of the beam on which it rests, and two upwardly-extending diverging arms.

Reinforcing members 4′, herein shown as round rods but which may have any suitable section, are passed through the holes 4 of each pair of saddles as shown in Fig. 2, and the reinforcing member 5, which may consist of a sheet of wire-mesh, expanded metal or the like, is bent into appropriate shape and supported in the saddles. In the particular construction illustrated in the drawings, the reinforcing member 5 is shown as wire-mesh bent sinuously and the lowermost parts thereof rest in the saddles and on the rods 4′ between the saddles. When the reinforcing member, bent into any suitable shape, has been placed in position, concrete, cement or the like is applied to both sides thereof, preferably by forcibly projecting the same by means of a cement gun. I prefer to first coat the under side of the member to form the concrete or cement coating 6, which is about equal in thickness to that of the arms of the saddle, and afterward the upper side. As shown at 6′ the rods 4′ are embedded in the finished structure and the roof is slightly thicker at this point than elsewhere. After the coating operation has been completed, manually or otherwise, the saddles, if of concrete and said coating form a homogeneous structure, and the rods 4′ and member 5 are embedded therein, resulting in a roof of great strength and durability.

While in the drawings I have shown the alternate ridges and gutters parallel to the slope of the roof, they may be arranged parallel to the ridge-pole, and eaves, or at any other angle.

If desired the saddles may be omitted, and the reinforcing member 5 supported by the rods.

It will be obvious that the reinforcing member may be stamped or otherwise formed in various shapes, thereby giving the roof when completed, the appearance of ornamental, overlapping tiling.

I claim:—

1. The method of forming roofs consisting in placing spaced pairs of saddles on supports, resting the gutter portions of a sinuous foraminous metallic sheet on said saddles, and applying coatings of cement to both sides of said sheet.

2. The method of forming roofs consisting in placing spaced pairs of saddles on supports, connecting each pair of saddles by reinforcing bars, resting the gutter portions of a sinuous foraminous metallic sheet on said saddles, and applying coatings of cement to both sides of said sheet and causing one of said coatings to cover said bars.

3. The method of forming roofs, consisting in placing spaced pairs of saddles on supports, resting the gutter portions of a sinuous foraminous metallic sheet on said saddles, and applying coatings of cement to both sides of said sheet and engaging said saddles to form a homogeneous structure.

4. The method of forming roofs consisting in placing spaced sets of reinforcing bars on supports to connect the opposite walls of a building, resting the gutter portions of a sinuous foraminous metallic sheet on said bars, and applying coatings of cement to both sides of said sheet and causing one of said coatings to cover said bars.

In testimony whereof, I have hereunto subscribed my name this 12th day of June, 1914.

WILLIAM L. CHURCH.

Witnesses:
AARON C. DANIELS,
JOSEPH J. SCHMIDT.